Jan. 11, 1966  F. R. SCHUBERT  3,228,729
BRAKE MECHANISM
Filed March 6, 1963  2 Sheets-Sheet 2

INVENTOR
Frank R. Schubert

BY *Scrivener and Parker*
ATTORNEYS

United States Patent Office 3,228,729
Patented Jan. 11, 1966

3,228,729
BRAKE MECHANISM
Frank R. Schubert, Elyria, Ohio, assignor to Bendix-Westinghouse Automotive Air Brake Company, Elyria, Ohio, a corporation of Delaware
Filed Mar. 6, 1963, Ser. No. 263,330
3 Claims. (Cl. 303—9)

This invention relates to a brake mechanism for vehicles and more particularly to a safety and parking brake mechanism for vehicles equipped with conventional air brake systems.

One of the principal objects of the present invention is to provide a novel compressed air safety and parking brake system for vehicles which is so constituted as to mechanically hold the brakes in applied position even though the system pressure drops below its normal safe value for vehicle operation.

Another object is to provide in a system of the above character, a novel arrangement wherein release of the brakes, after they have been applied and locked in the applied position, as above stated, may not be effected until the system pressure rises to a predetermined value such that it would be safe for the vehicle to proceed.

A further object is to provide a system wherein the brakes may be applied and locked in applied position by a novel arrangement providing an efficient emergency and parking brake construction under the direct supervision of the operator.

Other objects and novel features of the invention will appear more fully hereinafter from the following detailed description when taken in connection with the accompanying drawings. It is to be expressly understood, however, that the drawings are utilized for purposes of illustration only and are not to be taken as a definition of the limits of the invention, reference being had for this purpose to the appended claims.

Referring to the drawings wherein similar reference characters refer to similar parts throughout the several views.

Figure 1:
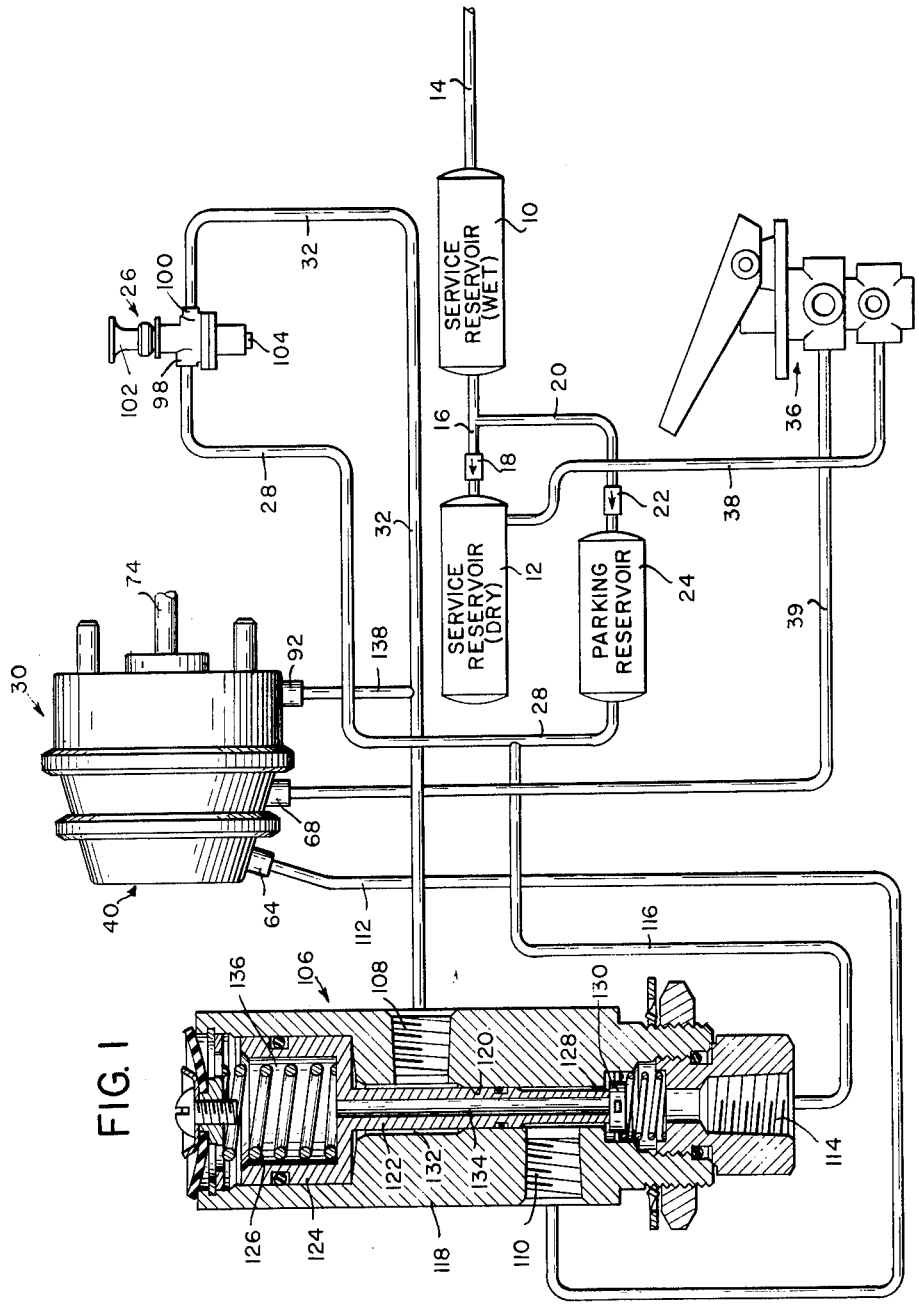
FIG. 1 is a diagammatic view partly in section of a safety and parking brake system embodying the principles of the present invention.

Referring more particularly to FIG. 1, the novel safety and parking brake system of the present invention is illustrated therein as including a pair of service reservoirs 10 and 12 which are adapted to be supplied with compressed air from any suitable source by way of conduit 14. The reservoirs 10 and 12 are interconnected by a conduit 16 including a one-way check valve 18, and reservoir 10 is connected through conduit 20 and one-way check valve 22 with a parking reservoir 24, the latter thus being adapted to serve as a protected source of compressed air which is connected with a control valve 26 by way of a conduit 28. By means to be described more fully hereinafter, the control valve 26 is adapted to control the fluid pressure energization of a combined emergency and service brake actuator 30 by way of conduit 32, the construction being such that a brake application may be mecahnically locked or released under certain conditions of operation of the system. A brake valve 36, of conventional construction, may be supplied with fluid pressure from the service reservoir 12, by way of conduit 38, and controls the service brake portion of the actuator 32 through a conduit 39.

Figure 2:
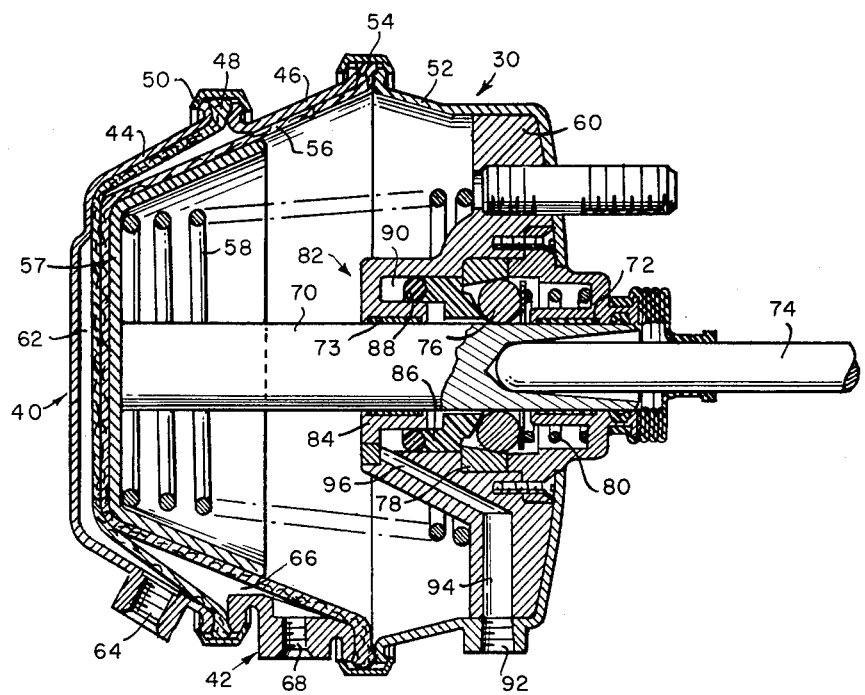
FIG. 2 is an axial sectional view of the brake actuator which is preferably used in the system of FIG. 1.
Figure 3:
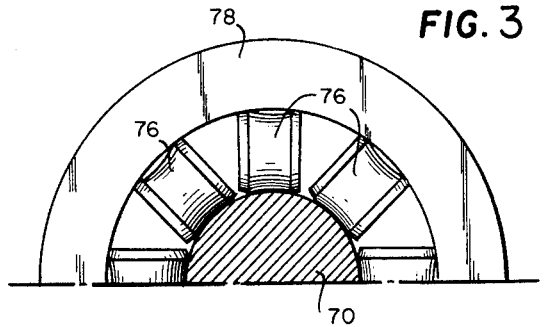
FIG. 3 is an enlarged transverse sectional view of a portion of the actuator of FIG. 2 illustrating the relationship of the brake locking rollers and the brake push rod.

Referring more particularly to FIG. 2, the actuator 30 includes an emergency or parking portion 40 and a service portion 42, the former including casing parts 44 and 46 having the peripheral portion of an emergency diaphragm 48 clamped therebetween by a suitable clamp 50. Part 46 is connected with casing part 52 by a clamp 54 with the peripheral portion of a service diaphragm 56 therebetween, a suitable push plate 57 bearing against the diaphragm 56 through the action of a return spring 58 having its opposite end bearing against the end wall 60 of the actuator. Emergency portion 40 includes an emergency chamber 62 provided with an emergency port 64 while the service portion 42 includes a service chamber 66 which is provided with a service port 68. In order to make the actuator 30 as short as possible, the casing parts 44 and 46 are tapered and the diaphragms 48 and 56 are arranged in nesting relationship with the service diaphragm 56 of a larger effective area. As shown, a push rod 70 is secured to the push plate 57 and is slideable through guides 72 and 73 carried by the end wall 60, the push rod being provided with a recess for receiving the end of a brake applying rod 74. As well understood by those skilled in the art, the opposite end of the break rod 74 may be connected with the vehicle brake through a conventional slack adjuster or other type of brake arm.

With the above arrangement it will be understood that when fluid pressure is supplied to the emergency chamber 62, both diaphragms 48 and 56 will be moved to the right to effect a brake application through corresponding movement of the push rod 70 and the brake rod 74.

The present invention provides an arrangement for mechanically and automatically locking the actuator 30 in brake applied position and as shown includes a brake lock comprising a plurality of locking rollers 76 which are interposed between a cam ring 78 and the push rod 70 and are normally urged into locking position by means of a spring 80. In this position, brake applying movement of the rod 70 to the right may take place. However, any movement of the rod 70 to the left, corresponding to brake releasing movement, is prevented since the locking rollers become firmly wedged between the ring 78 and the rod 70 through the action of the spring 80. Thus after the brake has been applied, the locking rollers 76 prevent brake releasing movement of the rod 70.

Means are provided for maintaining the locking rollers 76 in released position and preferably such means is controlled by fluid pressure. As shown, a fluid pressure control or release means 82 includes a cylinder 84 in which a deformable annular piston 86 of suitable plastic material is housed and positioned between on O-ring seal 88 and the rollers 76, the cylinder including a lock release chamber 90 to which fluid pressure from conduit 34 may be conducted by way of lock port 92 and ducts 94 and 96 formed in the end wall 60. Thus, when the chamber 90 is charged with fluid under pressure of a predetermined magnitude, piston 86 is effective to move the locking rollers 76 to the right against the tension of the spring 80 to relieve the locking effect of the rollers upon the push rod 70 and allow movement of the latter in opposite direction for brake application and release. On the other hand, when the chamber 90 is exhausted, the spring 80 is effective to move the rollers 76 into locking position and prevent any left hand movement of the push rod 70 as above described.

A novel arrangement including the control valve 26 is provided for controlling the operation of the actuator 30. Referring to FIG. 1, the control valve 26 is of the combined manual and automatically operable type and is preferably constructed as shown in the copending application of Harry M. Valentine, Serial Number 142,725 filed October 3, 1961, now Patent No. 3,173,653, and owned by the same assignee. Valve 26 includes an inlet 98 connected with the parking reservoir 24 by conduit 28 and also includes an outlet 100 connected with the conduit 32. A manually operable handle 102 is connected to operate a valve element within the valve 26 and the construction is such that with the handle moved to the inward position shown in FIG. 1, the inlet 98 is connected with the outlet 100 so as to establish communication between the conduits 28 and 32. On the other hand, when the handle 102 is moved outwardly, the inlet 98 is disconnected from the outlet 100 and the latter is connected to an exhaust opening 104. Under these conditions, the conduit 28 is closed by the control valve 26 and the conduit 32 is directly exhausted to atmosphere. It is desired to point out here, that the control valve is also capable of automatically moving to the last-mentioned position to exhaust the conduit 32 when the fluid pressure in the parking reservoir drops to a predetermined low value of about 40 p.s.i.

One of the important features of the present invention resides in the utilization of the variations in fluid pressure within the conduit 32, as controlled by the control valve 26, for controlling the energization of the brake actuator 30 to apply and lock the vehicle brake in the applied position for parking purposes. As shown, a fluid pressure operated control valve 106 is provided with a control port 108, connected with the conduit 32, an outlet port 110 connected by conduit 112 with the emergency port 64 of the actuator 30, and an inlet port 114 connected at all times with the parking reservoir 24 as by means of conduit 116 and 28. Control valve 106 includes a casing 118 formed with the aforementioned ports and provided with a centrally positioned bore 120 in which a valve control plunger 122 is slideably mounted. The upper portion of the plunger 122 has an enlarged head 124 and a spring 126 is normally effective to maintain the head 124 and plunger 122 in the position shown where the end 128 of the plunger engages a combined inlet and exhaust valve 130 to move the latter to open position to normally establish communication between the inlet port 114 and the outlet port 110. Bore 120 is provided with an enlarged portion 132 adjacent the inlet port 108 in order to subject the head 124 to the fluid pressure at the port 108 when the conduit 32 is charged with fluid pressure. In such event, the head 124 and plunger 122 will, at a predetermined pressure, be moved in a direction such that the end 128 of the plunger 122 will be moved out of contact with respect to valve 130 and communication will be established between the outlet port 110 and the atmosphere by way of a passage 134 formed in the plunger 122, passage 134 connecting with an exhaust chamber 136 in the head 124 which communicates with the atmosphere at all times. Thus it will be seen from the foregoing that when conduit 32 is exhausted, no fluid pressure will exist at the inlet port 108 and the control valve 106 will be moved to the position where the parking reservoir 24 is directly connected with the emergency port 64 of the actuator 30 by way of conduit 28, conduit 116, inlet port 114, outlet port 110 and conduit 112. On the other hand, when the conduit 32 is charged with fluid pressure and the inlet port 108 is likewise charged, the plunger 122 will be moved by a predetermined fluid pressure to a position where the outlet port 110 and hence the emergency port 64 of the actuator 30 will be exhausted to atmosphere. Since the vehicle brake will be applied when the emergency port 64 is charged with fluid pressure and released when such port is connected with the atmosphere, it will be seen that fluid pressure variations in the conduit 32 as controlled by the hand valve 26 will apply and release the brake actuating movements of the actuator 30.

In order to simultaneously control the actuation of the brake locking release mechanism 82 with the energization of the emergency brake portion 40 of the actuator 30, the lock port 92 is connected with the conduit 32 as by means of a conduit 138. Thus, as the conduit 32 is charged with fluid pressure to exhaust the emergency portion 40, the locking release device 82 is simultaneously charged with fluid pressure through the conduit 138 and the lock port 92 in order to render the locking device 82 inoperative. On the other hand, when the conduit 32 is exhausted and the valve 106 operates to charge the emergency port 64 to apply the brake, the locking release device 82 is likewise exhausted in order to permit the brake locking rollers 76 to become effective to lock the push rod 70 in the brake applied position in the event that there is any leakage of fluid pressure from the parking reservoir 24 which would otherwise cause a partial or complete release of the brake.

In the operation of the novel parking and safety brake construction heretofore described, it will be assumed that the control valve 26 occupies its normal position where the handle 102 is moved inwardly in order to connect the inlet 98 with the outlet 100. Under these conditions fluid pressure is conducted to the control port 108 of the control valve 106 by way of interconnected conduits 28 and 32. The control valve 106 will be moved to the exhaust position to exhaust the emergency portion 40 of the actuator 30 by way of emergency port 64, conduit 112, port 110, bore 134 and exhaust chamber 136. At the same time, the brake locking release device 82 will be charged with fluid pressure from the conduit 32 by way of conduit 138 and lock port 92 in order to render the brake locking rollers 76 ineffective.

If it is now desired to apply the vehicle brake, it is only necessary to move the handle 102 of the hand valve 26 to the outer position in order to interrupt communication between the inlet and outlet ports 98 and 100 respectively and to connect the outlet port 100 with the exhaust port 104. Under these conditions, conduit 32 is directly exhausted to atmosphere and the control valve 106 will be moved by the spring 126 to the position illustrated in FIG. 1 in order to connect the emergency portion 40 of the actuator 30 with the parking reservoir 24 by way of the emergency port 64, conduit 112, port 110, open valve 130 and conduit 116. At the same time, however, the brake locking release device 82 will likewise be exhausted to atmosphere by way of the lock port 92, conduit 138 and conduit 32 so that the locking rollers 76 will be effective to lock the push rod 70 in the brake applied position in the event there is any leakage of fluid pressure in the system.

In addition to the foregoing, it will be recalled that the control valve 26 is automatically operated by a reduction in pressure within the parking reservoir 24 to a value of approximately 40 p.s.i. When this occurs, the conduit 32 will be connected with the atmospheric port 104 and the emergency portion 40 of the brake actuator 30 will be charged with fluid pressure in the same manner as was above described in connection with the manual movement of the handle 102 of the valve 26 to its outer position.

When it is desired to release the parking brake operation of the actuator 30, as for example, when the handle 102 of the hand valve 26 is moved inwardly to charge the conduit 32 with fluid pressure, it may be that although the emergency portion 40 is exhausted and the brake locking release device 82 is charged with fluid pressure, still the action of the brake locking rollers 76 on the push rod 70 may be such as to maintain the push rod in its brake applied position. Under these circumstances, it is only necessary to actuate the brake valve 36 in order to supply fluid pressure from the service reservoir 12 to the service port 68 by way of conduits 38 and 39. Under these conditions, the application of fluid pressure to the service portion 42 of the actuator will provide sufficient forward motion of the push rod 70, due to the enlarged effective area of the service diaphragm 56, in order to allow the locking rollers 76 to disengage. Thus, when the brake valve 36 is moved to exhaust position the parking brake application will be released.

It is desired to point out that a service brake application may be made at any time upon operation of the brake valve 36 as above stated.

From the foregoing, it will be readily understood that the present invention provides a highly efficient parking brake arrangement wherein the brake may be applied by fluid pressure and may be mechanically locked in the applied position in the event of a reduction in the pressure of the fluid pressure source. The construction is such that the brake may be applied by merely manually operating the valve 26. Since the latter valve is also such that it will automatically move to the brake applied position when the fluid pressure at the source drops to a predetermined low value, it will be understood that the brake will be automatically applied in the event that the system pressure drops to such a value that it would be unsafe to operate the vehicle.

While the invention has been shown and described herein with considerable particularity, it will be understood by those skilled in the art that various modifications may be made therein without departing from the spirit of the invention. Reference will therefore be had to the appended claims for a definition of the limits of the invention.

What is claimed is:

1. A fluid pressure safety brake system having a reservoir of fluid pressure, a fluid pressure actuator for applying a vehicle brake, spring-applied brake locking means for locking said actuator in a brake applied position, fluid pressure operated release means for releasing said brake locking means, and means for controlling the application of fluid pressure to and from said actuator and to and from said release means comprising, a first valve having inlet, outlet and exhaust ports, said exhaust port being connected at all times with the atmosphere, a first conduit connecting said inlet port and reservoir, a second conduit directly connecting said outlet port and release means, said first valve being movabe to one positilon to connect said inlet and outlet ports to apply fluid pressure directly from said reservoir to said release means and being movable to a second position to disconnect said outlet port from the inlet port and to connect the outlet port with the exhaust port to exhaust fluid pressure from said release means, a second valve movable to one position to directly connect said reservoir and actuator and movable to another position to disconnect said reservoir from the actuator and connect the latter with the atmosphere, a pressure responsive element for controlling the movements of said second valve, said element having a pressure responsive part provided with an exhaust chamber, said element also having a plunger connected therewith and provided with a through bore, open at one end and communicating with the exhaust chamber at the other end, and a third conduit for subjecting said pressure responsive part at all times to the pressure in said second conduit, and a brake valve connected with said actuator for controlling the application of fluid pressure to and from said actuator.

2. A fluid pressure safety brake system having a reservoir of fluid pressure, a fluid pressure actuator for applying a vehicle brake, spring-applied brake locking means for locking said actuator in a brake applied position, fluid pressure operated release means for releasing said brake locking means, and means for controlling the application of fluid pressure to and from said actuator and to and from said release means comprising, a first valve having inlet, outlet and exhaust ports, said exhaust port being connected at all times with the atmosphere, a first conduit connecting said inlet port and reservoir, a second conduit directly connecting said outlet port and release means, said valve being movable to one position to connect said inlet and outlet ports to apply fluid pressure directly from said reservoir to said release means and being movable to a second position to disconnect said outlet port from the inlet port and to connect the outlet port with the exhaust port to exhaust fluid pressure from said release means, a second valve including a casing having a control port, an inlet opening, an outlet opening and an exhaust opening, first conduit means connecting said inlet opening directly with said first conduit, second conduit means connecting said control port with said second conduit, and third conduit means connecting said outlet opening with said actuator, said second valve including a valve member movable to one position for connecting said inlet and outlet openings and movable to another position to disconnect the inlet opening from the outlet opening and connect the latter with the exhaust opening, and means within the casing responsive to fluid pressure at said control port for moving said valve member to said positions, the last named means including a movable plunger having a pressure responsive part subjected to fluid pressure at said control port for moving said plunger in one direction, and a spring for moving said plunger in another direction, said pressure responsive part having an exhaust chamber formed therein and in constant communication with said exhaust opening, and said plunger having a bore, open at one end and communicating with the exhaust chamber at the other end, and a brake valve connected with said actuator for controlling the application of fluid pressure to and from said actuator.

3. A fluid pressure safety brake system having a reservoir of fluid pressure, a fluid pressure actuator for applying a vehicle brake, said actuator comprising a housing having a pair of cup-shaped diaphragms therein, one diaphragm defining a first pressure chamber between one side thereof and one end wall of the housing, and both diaphragms defining a second pressure chamber therebetween, the cross sectional area of said one diaphragm being less than the other diaphragm, resilient means interposed between the other diaphragm and the other end wall of the housing for normally maintaining the central portions of the diaphragms in contacting relationship and with a part of the central portion of said one diaphragm in engagement with said one end wall, a brake rod operatively connected with the other diaphragm and extending through said other end wall, spring-applied brake locking means in said housing for locking said rod against movement toward said one end wall, fluid pressure operated release means for releasing said brake locking means, means for controlling the application of fluid pressure to and from said first pressure chamber and to and from said release means comprising, a fluid pressure operated control valve having a pressure responsive element movable in one direction in response to fluid pressure to connect the first pressure chamber with the atmosphere and movable in the opposite direction in response to release of fluid pressure to disconnect said atmospheric connection to the first pressure chamber and connect the latter with said reservoir, means including a manually operable control valve movable to one position to simultaneously connect said reservoir with said pressure responsive element and said release means and movable to another position to connect said element and release means with the atmosphere, and means for controlling the application of fluid pressure to and from said second pressure chamber, comprising a brake valve, a connection between said brake valve and source, and a conduit directly connecting said brake valve with said second pressure chamber independently of said fluid pressure operated control valve.

References Cited by the Examiner

UNITED STATES PATENTS

| 1,484,475 | 2/1924 | Crown | 303—89 |
| 3,011,832 | 12/1961 | Euga | 303—9 X |
| 3,037,819 | 6/1962 | Sukala | 303—89 |

MILTON BUCHLER, *Primary Examiner.*

FERGUS S. MIDDLETON, *Examiner.*